(12) United States Patent
Lindén et al.

(10) Patent No.: US 8,131,090 B2
(45) Date of Patent: Mar. 6, 2012

(54) ONE CLICK MESSAGE

(75) Inventors: Kjell Lindén, Hägersten (SE); Anders Kvist, Hägersten (SE)

(73) Assignee: In View AB, Danderyd (SE)

( * ) Notice: Subject to any disclaimer, the term of this patent is extended or adjusted under 35 U.S.C. 154(b) by 806 days.

(21) Appl. No.: 11/718,670

(22) PCT Filed: Nov. 9, 2005

(86) PCT No.: PCT/SE2005/001683
§ 371 (c)(1),
(2), (4) Date: May 8, 2008

(87) PCT Pub. No.: WO2006/052193
PCT Pub. Date: May 18, 2006

(65) Prior Publication Data
US 2009/0005007 A1    Jan. 1, 2009

(30) Foreign Application Priority Data

Nov. 11, 2004  (SE) ..................................... 0402746

(51) Int. Cl.
*G06K 9/36* (2006.01)
(52) U.S. Cl. ...................................................... 382/232
(58) Field of Classification Search .................. 382/232, 382/236, 325; 358/1.15, 440, 442; 455/412.1, 455/414.4, 517, 552.1
See application file for complete search history.

(56) References Cited

U.S. PATENT DOCUMENTS

| 2002/0039895 A1 | 4/2002 | Ross et al. |
| 2004/0203611 A1 | 10/2004 | Laporta et al. |

FOREIGN PATENT DOCUMENTS

| EP | 0 999 678 A2 | 11/1999 |
| JP | 2004-135027 | 12/1992 |
| JP | 2001-177467 | 6/2001 |
| JP | 2002-161354 | 1/2004 |
| KR | 20010089848 A | 10/2001 |
| WO | 9916181 A1 | 4/1999 |
| WO | WO 00/47005 | 8/2000 |

*Primary Examiner* — Duy M Dang
(74) *Attorney, Agent, or Firm* — Holland & Hart LLP

(57) ABSTRACT

The present invention relates to transmitting a communication message from a first user operating a first communication device to user operating at least a second communication device, wherein the first communication device comprises a switch, a presentation device, a selection device and a recording device. The invention comprises detecting activation/deactivation of the switch in the first communication device occurring by operation of the switch by the first user; operating the recording device while the switch is activated; digitally encoding the information recorded by the recording device, and; packaging the digitally encoded information into a digital message and sending the digital message to the network address identified by the record selected by the user when the switch is deactivated without any further actions from the user.

28 Claims, 3 Drawing Sheets

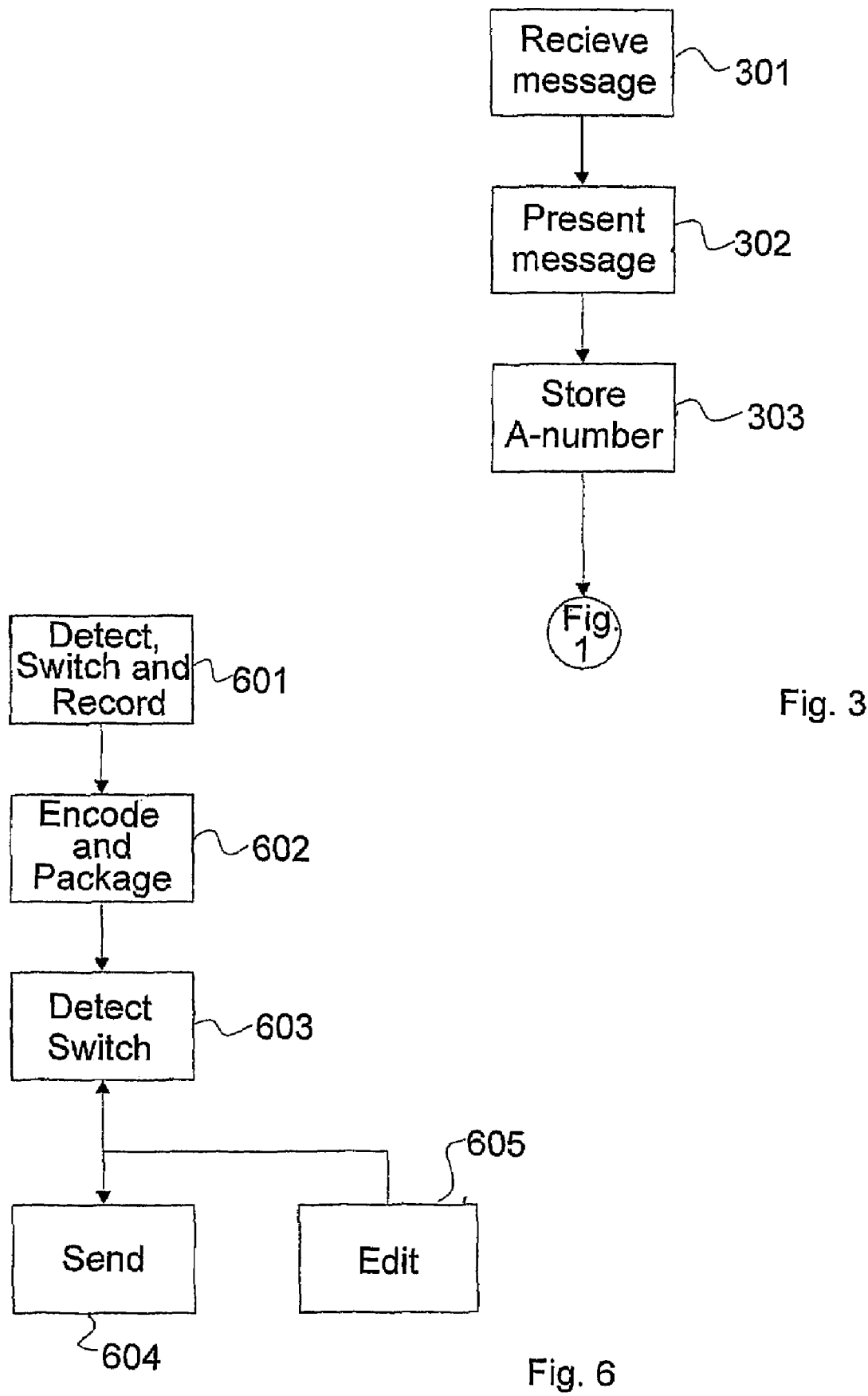

ONE CLICK MESSAGE

TECHNICAL FIELD

The present invention relates to a communication device for sending messages to another communication device and a method therefore. More specifically the present invention relates to a communication device that significantly simplifies the process of sending a message comprising digitally encoded information from one user to another and a method therefore.

BACKGROUND OF THE INVENTION

Today, telecommunication devices are constantly getting more and more versatile and therefore complex, providing a never-ending stream of new features and services. This complexity will occasionally also result in that the telecommunication device, such as a mobile cellular telephone, a cellular connected mobile computer, a network connected personal digital assistant (PDA), a networked computer etc, offering these features and services also will be complex, and thus difficult to operate, especially for a user who is not computer-skilled or a user who only occasionally uses a specific service.

Furthermore, as the devices comprise more and more features, even skilled users may find it hard to navigate through menus in order to reach the particular feature or service requested.

Thus, there is a need to simplify the handling process of telecommunication devices.

SUMMARY OF THE INVENTION

It is a main object of the present invention to provide such apparatus and method that at least alleviate the above problems.

It is in this respect a particular object of the invention to provide such a device and method that enables a user to send a message to another user in a very simple manner.

It is still a further object of the invention to provide such a device and method that enables a user to send a message to another user by simply depressing and releasing a button.

It is still a further object of the invention to provide such a device and method that enables a user to send a message comprising recorded information, such as sound, a picture or video, to another user by simply operating a button.

It is still a further object of the invention to provide such a device and method that enables a user to send digitally encoded information, such as a voice message, text, a picture or a combination of those, or a video message possibly including sound, in an MMS message to another user by simple operation of a button, such as depressing and releasing a button.

The above objects among others are, according to a first aspect of the present invention, attained by a method for transmitting a communication message from a first user operating a first communication device to user operating at least a second communication device, wherein the first communication device comprises a switch, a presentation device, a selection device and a recording device.

The method comprises the steps of: detecting activation/deactivation of the switch in the first communication device occurring by operation of the switch by the first user; operating the recording device while the switch is activated; digitally encoding the information recorded by the recording device, and; packaging the digitally encoded information into a digital message and sending the digital message to the network address identified by the record selected by the user when the switch is deactivated without any further actions from the user.

The above objects among others are, according to a second aspect of the present invention, attained by a communication device provided to send a message from the communication device to a second communication device, wherein the communication device comprises a recording device.

The communication device further comprises a switch operable to take a first position or a second position by a user of the communication device, and a control device provided to activate the recording device and record information when the switch takes the first position, and wherein the control device is further provided to encode and package the recorded information in a digital message and send the digital message when the switch takes the second position without any further actions from the user.

By the arrangement according to the first and second aspects above a user may send a digital message, comprising information recorded by the user, to another user by simply operating a switch. This provides for the possibility for a person who is not particularly skilled in the operation of the communication device to send a recorded message to another user, or respond to a received message, in a very simple manner. The arrangement also increases the general usability of the communication device.

According to one variant the first aspect of the present invention comprises the further steps of: presenting a list of records on the presentation device for selection of at least one record by the user using the selection device, wherein the records comprises at least a network address identifying a specific communication device.

According to one variant the first aspect of the present invention comprises the further steps of: receiving digitally encoded messages comprising at least a network address identifying the second telecommunication device from the second telecommunication device, and; presenting the received messages as the records in the list of records.

The communication device may be provided to arrange all incoming messages in a list. When the user selects one message in the list, the message is presented to the user and the user may reply to the message by record an own message and send the message to the sender of the selected message by simply operating the switch.

According to one variant the first aspect of the present invention comprises the further steps of: receiving a digitally encoded message comprising at least a digital encoded information part and a network address identifying the address information of the telecommunication device sending the digitally encoded message to the first telecommunication device; decoding the digitally encoded information part and presenting the decoded information to the user using the presentation device, and presenting the received message as the only record in the list of records.

When a message, possibly comprising a digitally encoded information part, such as a voice message, is received by the communication device, the message is presented to the user, according to this variant of the present invention possibly together with other information stored in the communication device in relation to the network address such as a picture of the sending part, and by operating the switch the user may immediately reply to the received massage with a newly recorded message without any other operation than the operation of the switch. This provides for immediate communication where messages comprising recorded information are exchanged back and forth between two users in a very simple manner. According to this variant of the invention the user need not actively select the sender of the first message from the list, but the newly recorded message is rather per default sent to the sender of the first message.

According to one variant the first aspect of the present invention comprises the further steps of: accessing a register in the first communication device comprising records containing at least a network address, and presenting at least a subset of the register as the list of records.

The communication device may, according to this variant of the invention, comprise means for storing known names and telecommunication addresses in the communication device, such as telephone numbers to family and friends. The communication device may then be provided to present these as the list.

According to one variant of the present invention the register is a telephone book where each record comprises at least a name and a telephone number. Other information details may of course also optionally be present, such as a picture, text messages, voice recordings, date and time of last contact etc.

According to one variant of the present invention the presentation device is selected from a set of presentation devices comprising: a image presentation device, a text presentation device a sound presentation device, a combination of a image and sound presentation device, a video presentation device, a combination of video and sound presentation device, a TV-monitor connected to the first communication device, a digital screen integrated with the first communication device etc.

According to one variant of the present invention the recording device is selected from a set of recording devices comprising: an image recording device, a video recording device, a sound recording device, a combination of image and sound recording device and a combination of video and sound recording device According to one variant of the present invention the record comprises information selected from a set of information comprising: first name, family name, telephone number, work name, work position etc According to one variant of the present invention the selection device is a joystick. A joystick, or a four or five way button, is a device which is suitable for selecting records presented on a screen. The joystick may also be used as the switch, specifically if it is a 5-way button, in which case depressing and releasing the joystick may constitute the operation of the switch.

According to one variant of the present invention the network address is a telephone number or an IP-address.

According to one variant of the present invention the communication device is a telephone, a computer connected to a fixed or cellular network or a cellular phone.

According to one variant of the present invention the switch is a button on the communication device. A button provided on the communication device is a suitable way of implementing the switch since it is easily accessible and operable. But is should also be clear that other ways are equally possible such as a logical button on a screen which is selected by operation of the selection device.

According to one variant of the present invention the digital message is a Multimedia message conforming to the MMS (Multimedia Message Service) standard.

According to one variant of the present invention the recording device is a microphone and the recorded information is sound.

According to one variant of the present invention the switch is a spring-loaded button provided to take the second position when not depressed by a user, and being depressible to take the first position when depressed by a user.

According to one variant of the present invention wherein the communication device comprises a first unit providing access to a radio communication network and being connectable to a TV-set, the communication device is operable using a remote and where the switch and recording device are provide on the remote.

The above objects among others are, according to a third aspect of the present invention, attained by communication system comprising a first communication device, a second communication device and at least one network node located in a network for sending a message from the first communication device to the second communication device using the network via the at least one network node. The communication system is characterised in that at least the first communication device comprises means for executing the method according to the first aspect of the invention.

According to one variant of the third aspect of the invention the message is stored at the first communication device after sending the message to the second communication device.

Thus, it is possible for the user of the first communication device to keep track of the messages sent.

According to one variant of the third aspect of the invention the message is stored at the second communication device when received by the second communication device so that a user of the second communication device may view the message at a selected point in time.

Thus, it is possible for the user of the second communication device to keep track of the messages received. Moreover the user of the second communication device need not respond to the reception of the message immediately, that is in real time, but may instead select to view the message at a later time. The user may also receive messages from several different senders substantially simultaneously, and may at his/hers leisure select which message to respond to and at which time.

According to one variant of the third aspect of the invention the at least one network node comprises means for storing the message sent by the first communication device if the second communication device is not connected to the network and to send the message to the second communication device when the second communication device reconnects to the network.

According to this variant the user of the second communication device may receive the message at a later time if he/she is disconnected from the network.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1 to 6, which are given by way of illustration only, and thus are not limitative of the present invention.

FIG. 3 is a flow diagram of another variant according to the first aspect of the invention.

FIG. 6 is a flow diagram of another variant according to the first aspect of the present invention.

PREFERRED EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 4:
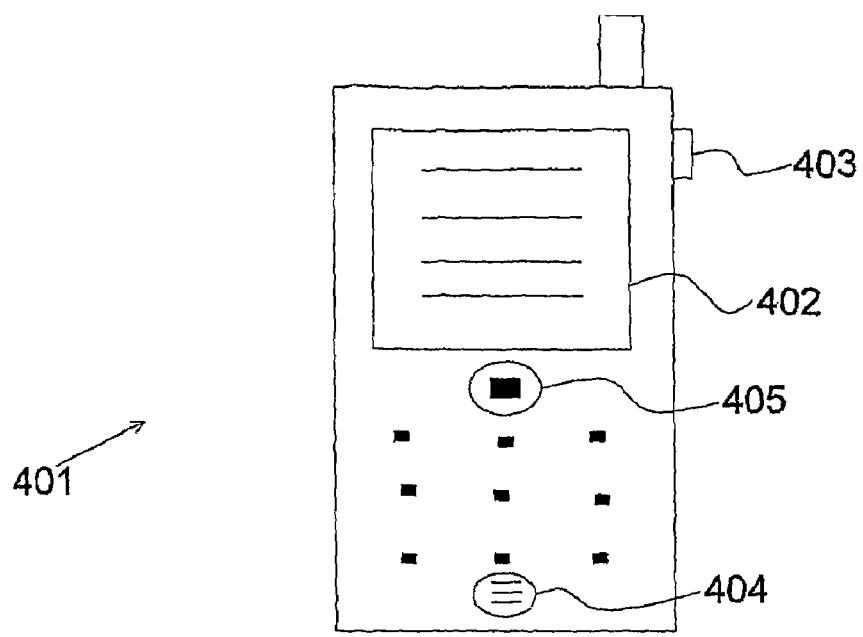
FIG. 4 is a schematic view of a first telecommunication device implementing the present invention.

FIG. 4 is a cellular telephone 401 according to one aspect of the present invention. The telephone comprises a presentation device 402, in this embodiment a LCD display, a switch 403, in the present embodiment in the form of a button, and a microphone 404. A selection device 405 is provided for selecting records presented on the LCD display 402.

A video recorder may optionally be included in the cellular telephone 401 as may further buttons or switches, including a keyboard or a keypad (not shown).

As an alternative the selection device 405 may be a so called 5-way button, in which case the selection device may be used as the switch. In this case the switch 403 is not needed.

Figure 5:
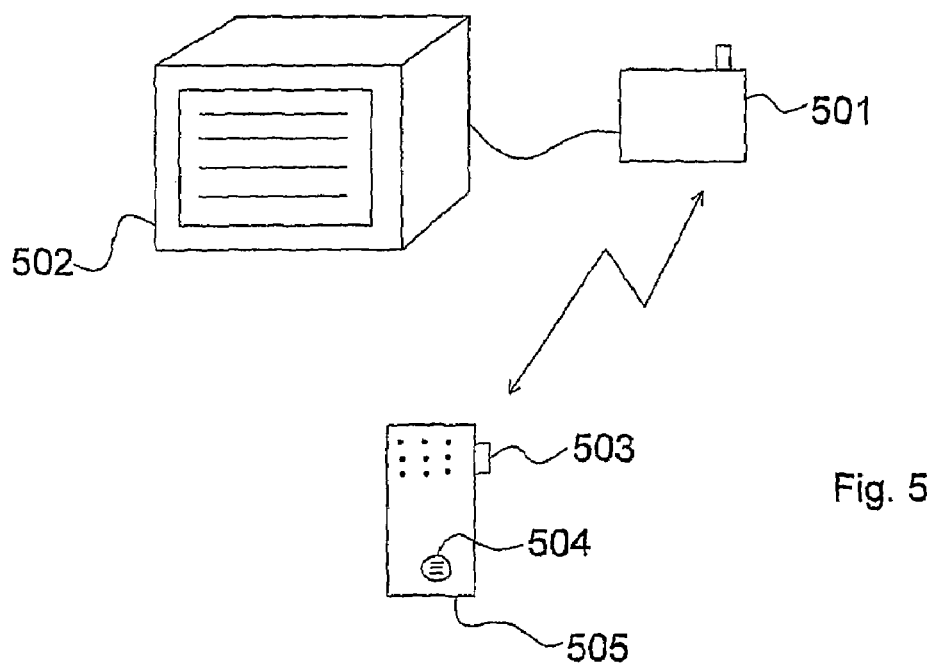
FIG. 5 is a schematic view of a second communication device implementing the present invention.

FIG. 5 is a telecommunication device according to another aspect of the invention comprising a communication unit 501 connected to a television set 502 which is usable for all variants of the invention described herein. The television set 502 operates as a presentation device and may display information from the communication device 501 possibly superimposed on a television signal. A remote control or remote 505 comprises a button 503 and a microphone 504 and is designed to control the communication device 501 and/or the television set 502. If the remote 505 controls the television set it is possible to design the television set to relay signals received at the television set 502 to the communication device 501. The arrangement in FIG. 5 is further disclosed in the Swedish patent application SE 0301404-0 which is hereby incorporated by reference. The device described in SE 0301404-0 is described to operate with a mobile phone, it should however be clear that the present invention may work with a device according to SE 0301404-0 even if the device is connected to the fixed network.

The operation of the telecommunication devices in FIGS. 4 and 5 will now be described with reference to FIGS. 1 to 3.

Figure 1:
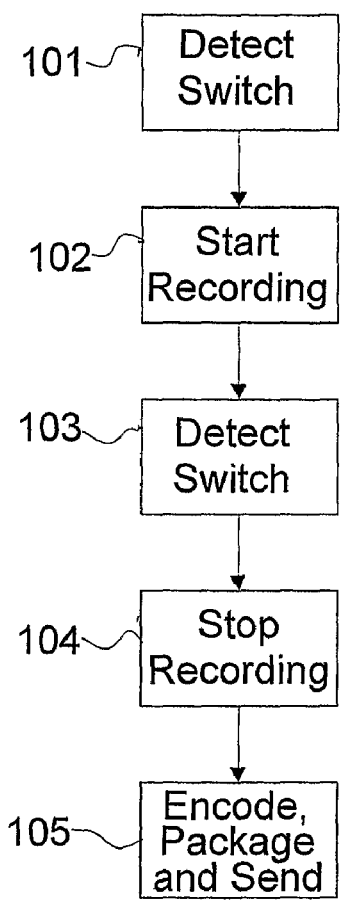
FIG. 1 is a flow diagram of one basic variant according to the first aspect of the invention showing the general concept.

FIG. 1 is a schematic flow diagram disclosing the basic operation of a telecommunication device shown in FIGS. 4 and 5 according to one variant of the present invention. The operation will be described primarily with reference to the communication device in FIG. 4 but the operation of the communication device in FIG. 5 is similar. In step 101 the state of the switch or button 403 is detected and when the button 403 is depressed the operation continues at step 102. At step 102 the communication device 401, 501 starts recording sound using the microphone 404. The user of the telecommunication device may then talk or record any other sound using the microphone, which is subsequently captured by the microphone and stored in the telecommunication device 401. At step 103 the switch 403 is monitored and when the switch 403 is released the execution continues with step 104 where the microphone is switched off and the recording stops. The recorded sound is then in step 105 encoded and packaged into a digital message which is sent to a receiver. Thus, a digital multimedia message has been recorded and sent by means of simply depressing and releasing a button.

This embodiment could be particular useful as a tool for e.g. elderly care in the home, care at a hospital or as a tool for ordering extra service at a hotel room or elderly care centre, where a user may send a voice massage to a predefined number asking for assistance. Thus, the recorded message will be sent to a predefined telephone number, such as a 24 hour assistance service.

Figure 2A:
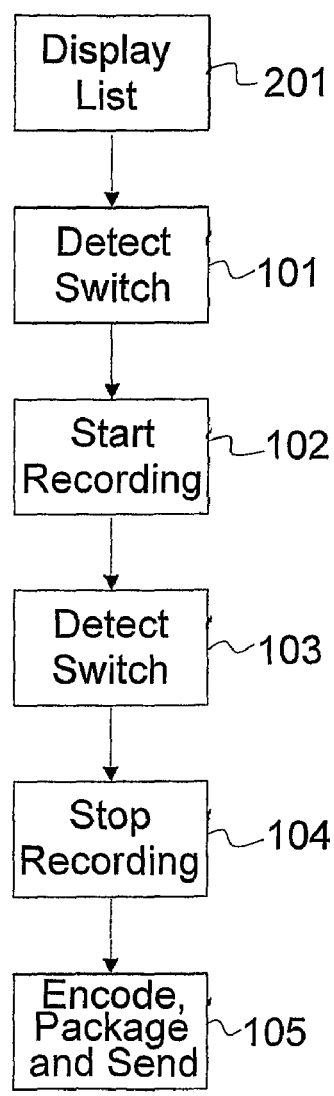
FIGS. 2a and 2b are flow diagrams of other variants according to the first aspect of the invention.
Figure 2B:
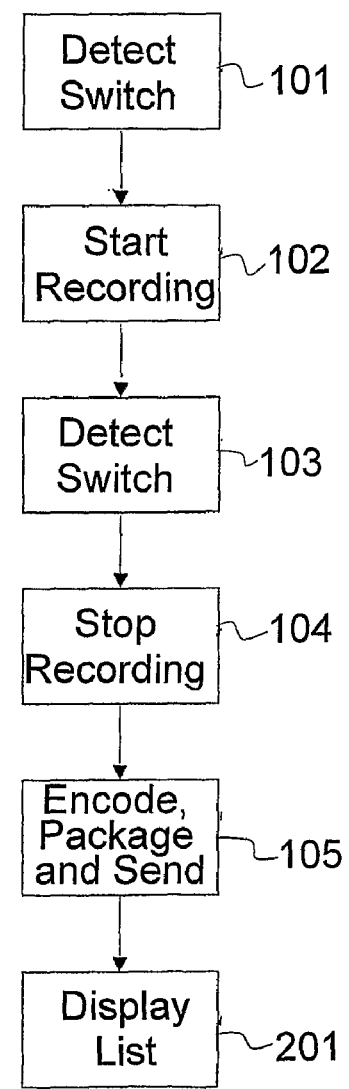

FIGS. 2a and 2b are schematic flow diagrams of two variants of the present invention. Similar details are denoted by the same reference numerals as in FIG. 1. According to this variant the user of the telecommunication device 401 is presented with a list of possible receivers on the LCD display 402. The user selects the receiver of the recorded message from the list. The user may, according to the flow diagram in FIG. 2a, select the receiver or receivers prior to recording the message, or according to the flow diagram in FIG. 2b after recording the message. The list may be a list of telecommunication addresses, such as a telephone number or an IP-address, received in previous messages or a list of names and associated telecommunication addresses from a telephone book stored in the telecommunication device.

It should be clear that the telecommunication device 401 may be equipped with a video recording device, in which case the operation of the switch 403 may record a video message, possibly including a voice message.

FIG. 3 is a schematic flow diagram according to one variant of the present invention. In this variant of the invention a message, possibly including multimedia content such as a voice message, is received at the telecommunication device 401 in step 301. The message is presented to the user of the telecommunication device 401 in step 302 and the telecommunication address, such as the telephone number, of the sending part is stored in the telecommunication device 401, step 303. The execution now continues as is described in connection with FIG. 1, that is the switch 403 is monitored and a message is recorded, encoded and packaged, steps 101 to 105. When the recorded message is sent the telecommunication address stored in step 303 is used as the B-number, that is the recorded message is sent to the user sending the previous message as a response.

FIG. 6 is a schematic flow diagram according to one variant of the present invention. This variant comprises methods to avoid sending a recorded message by accident. Step 601 corresponds to the steps 101 to 104 in FIG. 1 that is detection of the switch and recording of an information message. In step 602 the recorded information is encoded and packaged but however not sent yet. Before the message is sent the switch 403 is once again monitored 603 and the user is encouraged to once again depress the switch to confirm sending the recorded message. The user may be informed of the intended receiver of the message along with other information relating to the message such as the size, using the LCD display 402. The user may further view, listen and review the message before the message is sent. If the user quickly depresses and releases the switch 403, the message is sent step 604, if the user holds the switch 403 depressed for a longer duration than a first threshold the user is provided with the possibility the edit the message 605, such as to for instance add a text part etc. During the editing the user may of course choose to delete the message and not send it. Obviously it is possible to implement the above describe functionality so that the user may edit the message, step 605, after quickly depressing and releasing the switch. If the user depresses the switch longer than the first threshold the message is sent according to this variant of the invention.

Alternatively the user may be requested to enter a safety code to be able to send the message to thereby provide a childproof lock.

As a further alternative the user may be presented with a list of users currently logged on to a server. The user may then select a recipient of a message from this list.

It will be obvious that the invention may be varied in a plurality of ways. For instance is it obvious that the user may select more than one recipient for the recorded message. Such variations are not to be regarded as a departure from the scope of the invention. All such modifications as would be obvious to one skilled in the art are intended to be included within the scope of the appended claims.

The invention claimed is:

1. A method for transmitting a non-real time communication message from a first user operating a first communication device to at least a second communication device, the method comprises the steps of:
   detecting activation/deactivation of a switch in the first communication device occurring by operation of the switch by the first user,
   operating a recording device while it is detected that the switch is activated,
   digitally encoding the information recorded by the recording device,
   packaging the digitally encoded information into a digital message,
   sending the digital message to a network address when it is detected that the switch is deactivated without any further actions from the first user,
   wherein the method is performed in response to a received multimedia message comprising at least text or picture data and wherein the first communication device is connected to a presentation device, and
   displaying the received message on the presentation device.

2. The method according to claim 1, comprising the further step of:
   presenting a list of records on the presentation device for selection of at least one record by the user,
   selecting from the list of records at least one record by the user using a selection device, wherein the at least one selected record comprises at least a network address identifying a specific communication device, and wherein the network address in the step of sending is the network address in the record selected by the user.

3. The method according to claim 2, comprising the further steps of:
   receiving a digitally encoded message comprising at least a network address identifying the second communication device from the second communication device, and
   presenting the received message as the records in the list of records.

4. The method according to claim 2, comprising the further steps of:
   receiving a digitally encoded message comprising at least a digital encoded information part and a network address identifying the address information of the communication device sending the digitally encoded message to the first communication device,
   decoding the digitally encoded information part and presenting the decoded information to the user using the presentation device, and
   selecting the received message as the selected record in the list of records without any operation by the user.

5. The method according to claim 2, wherein the record comprises information selected from a set of information consisting of: a first name, a family name, a telephone number, a work name, or a work position.

6. The method according to claim 1, comprising the further steps of:
   accessing a register in the first communication device comprising records containing at least a network address,
   presenting at least a subset of the register as the list of records.

7. The method according to claim 6, wherein
   the register is a telephone book where each record comprises at least a name and a telephone number.

8. The method according to claim 1, wherein the recording device is selected from a set of recording devices consisting of: an image recording device, a text recording device, a video recording device, a sound recording device, a combination of an image and a sound recording device or a combination of a video and a sound recording device.

9. The method according to claim 1, wherein the selection device is a joystick.

10. The method according to claim 1, wherein the network address is a telephone number or an IP-address.

11. The method according to claim 1, wherein the communication device is selected from the group of communication devices consisting of: a telephone, a computer connected to a fixed network, a computer wireless network, or a wireless phone.

12. The method according to claim 1, wherein the digital message is a Multimedia message conforming to the MMS (Multimedia Message Service) standard.

13. The method according to claim 1, wherein the recording device is a microphone and the recorded information is sound.

14. The method according to claim 1, further comprising the steps of:
   monitoring the switch once again before sending the message, and
   encouraging the user to once again depress the switch to confirm sending the recorded message.

15. The method as claimed in claim 1, further comprising the step of:
   requesting the user to enter a safety code before sending the message thereby providing a childproof lock.

16. The method as claimed in claim 1, further comprising the step of:
   quickly depressing and releasing the switch thereby transmitting the message.

17. The method as claimed in claim 1, further comprising the step of:
   depressing the switch for a longer duration than a first threshold, whereby the user is provided with the possibility to edit the message.

18. A communication system comprising a first communication device, a second communication device and at least one network node located in a network for sending a non-real time message from the first communication device to the second communication device using the network via the at least one network node, characterized in that,
   at least the first communication device comprises means for executing the method according to claim 1.

19. The communication system according to claim 18, wherein
   the non-real time message is stored at the first communication device after sending the non-real time message to the second communication device.

20. The communication system according to claim 18, wherein the non-real time message is stored at the second communication device when received by the second communication device so that a user of the second communication device may view the non-real time message at a selected point in time.

21. The communication system according to claim 18, wherein
the at least one network node comprises means for storing the message sent by the first communication device if the second communication device is not connected to the network and to send the non-real time message to the second communication device when the second communication device reconnects to said network.

22. The method as claimed in claim 1, wherein the communication message is sent as a non-real time message in a cellular network.

23. The method according to claim 1, wherein the presentation device is selected from a set of presentation devices consisting of: an image presentation device, a sound presentation device, a combination of an image and a sound presentation device, a video presentation device, a combination of a video and a sound presentation device, a television monitor connected to said first communication device, or a digital screen integrated with said first communication device.

24. A communication device with a remote control, which communication device is provided to send a non-real time message from the communication device to a second communication device, wherein the remote control is arranged to control the communication device, wherein the communication device is operable by use of the remote control and comprises a recording device, the communication device further comprises:

a first device providing access to a network and that is connectable to a television receiver, and is adapted to present a received message on the television receiver, further comprising:
a switch operable to take a first position or a second position by a user of the communication device, wherein the switch is provided on the remote control,
a control device provided to activate the recording device and record information when the switch takes the first position, and wherein the control device is further provided to encode and package the recorded information in a digital message and send the digital message in response to the received and presented message when the switch takes the second position.

25. The communication device according to claim 24, further comprising
a presentation device provided to display a list of receivers of the digital message.

26. The communication device according to claim 24, further comprising
a selection device provided to be used by the user to select a receiver of the digital message from the list of receivers.

27. The communication device according to claim 24, wherein the switch is a spring-loaded button provided to take the second position when not depressed by the user, and being depressible to take the first position when depressed by the user.

28. The communication device according to claim 24 wherein the network is a radio communication network.

* * * * *